United States Patent [19]

Sharret

[11] 4,000,377
[45] Dec. 28, 1976

[54] DIGITAL COMPOUND CONFERENCE SYSTEM

[75] Inventor: Igal Pessah Sharret, West Orange, N.J.

[73] Assignee: International Telephone and Telegraph Corporation, Nutley, N.J.

[22] Filed: Oct. 24, 1975

[21] Appl. No.: 625,426

[52] U.S. Cl. .................................... 179/18 BC
[51] Int. Cl.$^2$ .................................... H04M 3/56
[58] Field of Search .......................... 179/18 BC

[56] References Cited
UNITED STATES PATENTS 3,882,200   5/1975   Goutmann ............... 179/18 BC X Primary Examiner—William C. Cooper
Attorney, Agent, or Firm—John T. O'Halloran; Alfred C. Hill

[57] ABSTRACT

The system includes a master digital conference unit and a plurality of remote digital conference units with a plurality of trunks each connecting a different one of the remote digital conference units to the master digital conference unit. A plurality of conferee subsets are coupled to the master digital conference unit and a plurality of groups of conferee subsets, each group of conferences being coupled to a different one of the plurality of remote digital conference units. The master and the plurality of remote digital conference units cooperate under control of the master digital conference unit to connect the plurality of conferee subsets and the plurality of groups of conferee subsets into a single compound conference.

14 Claims, 19 Drawing Figures

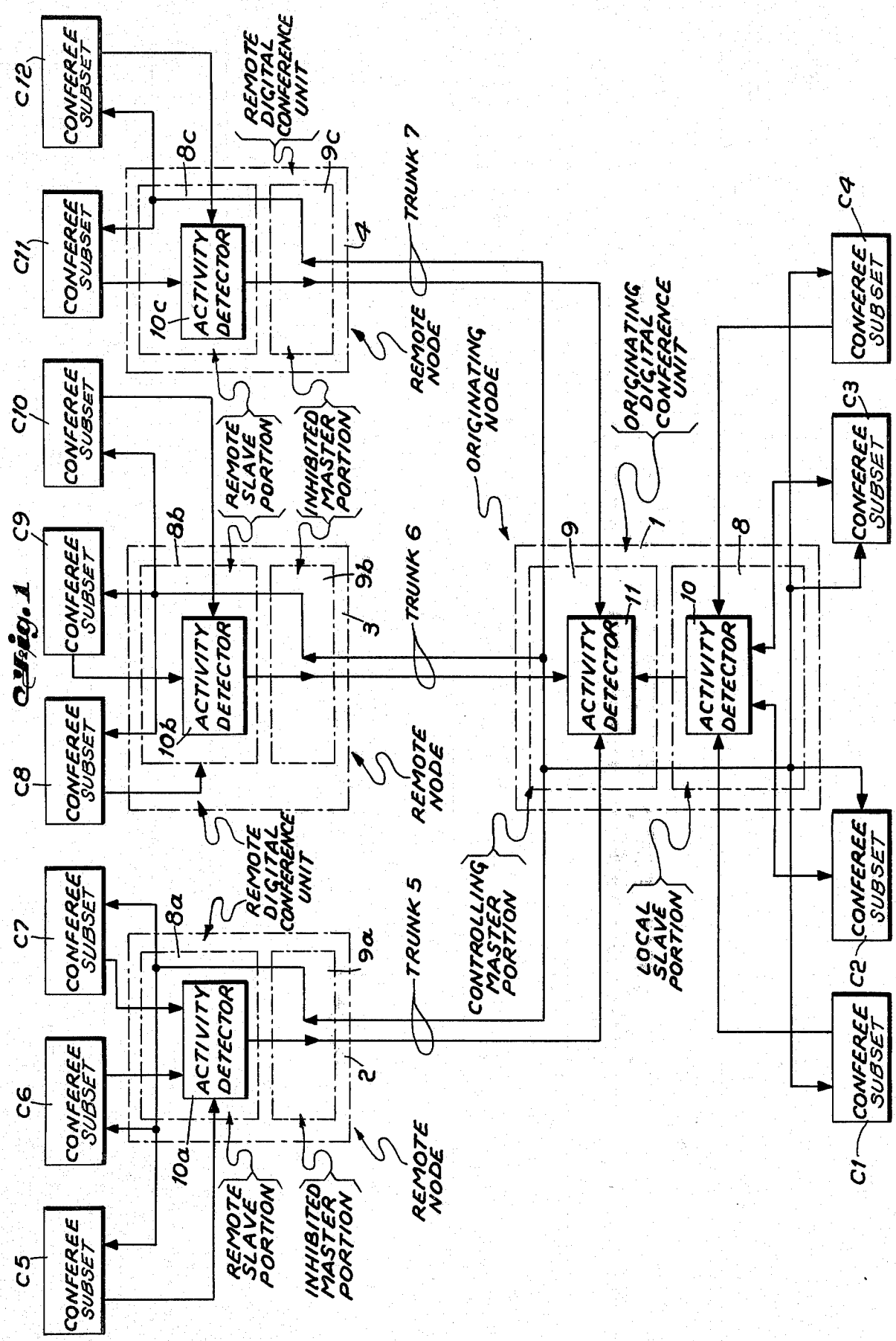

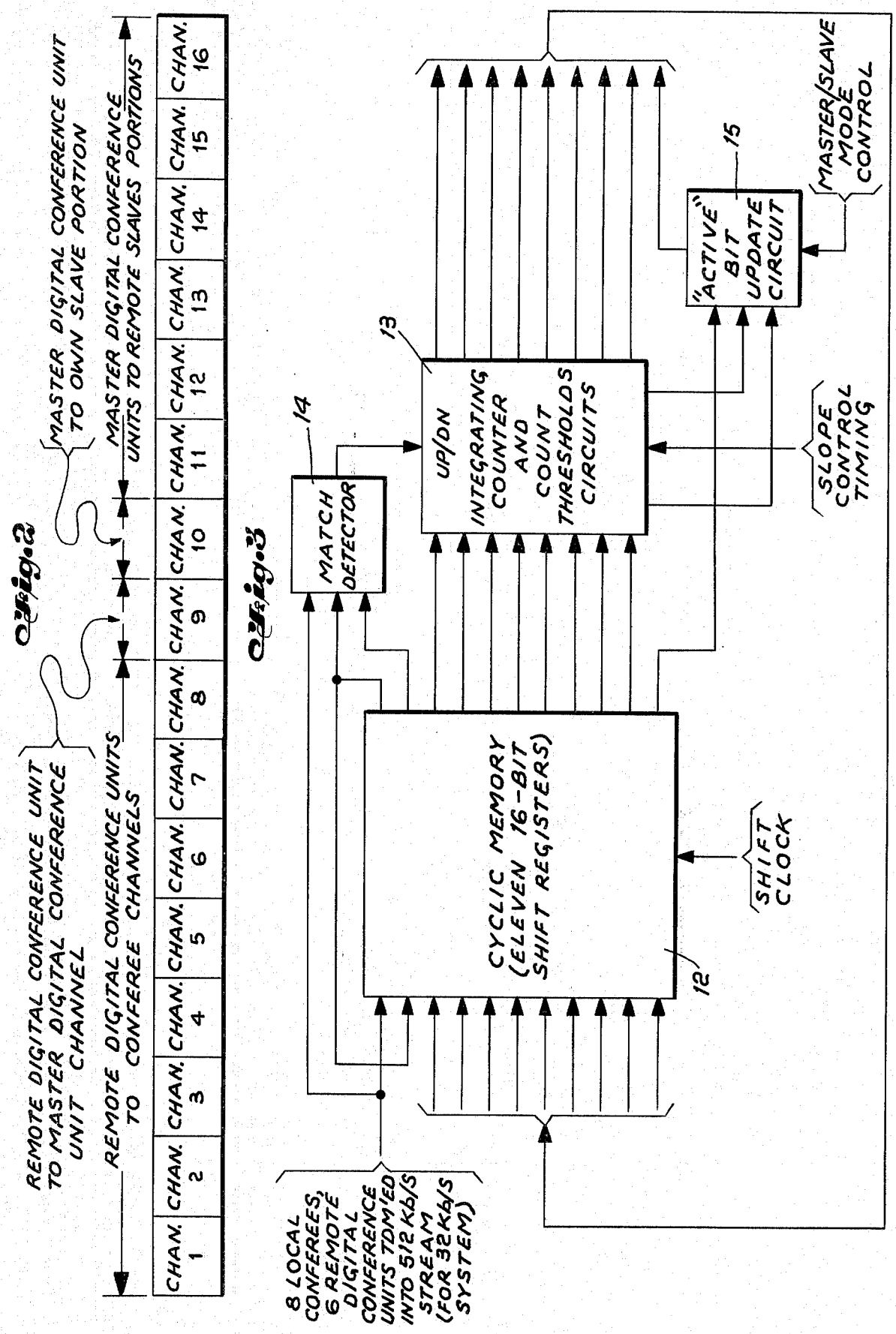

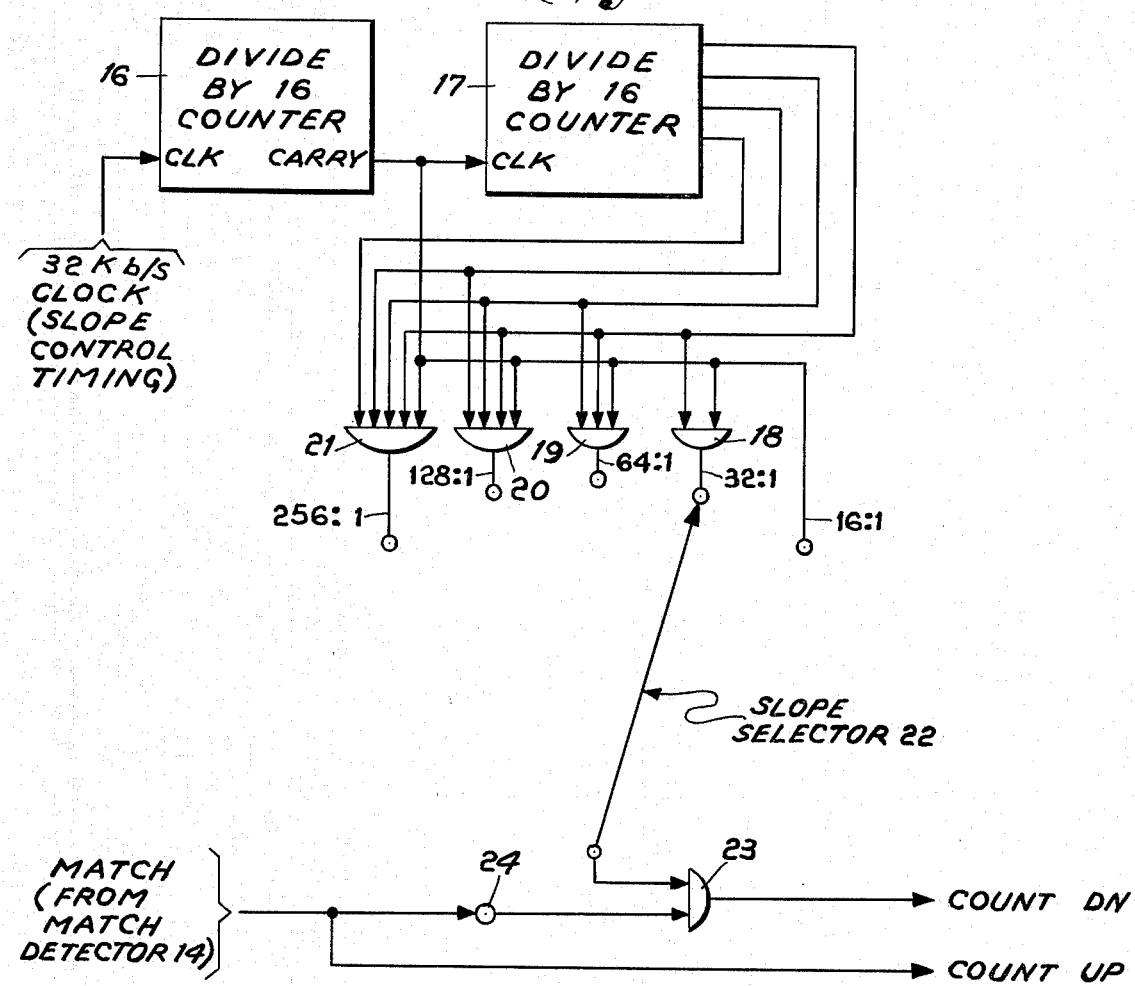
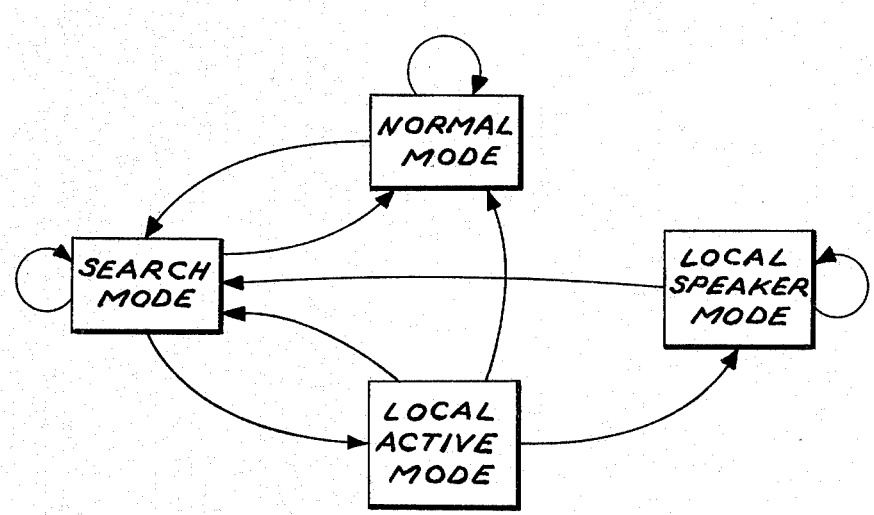
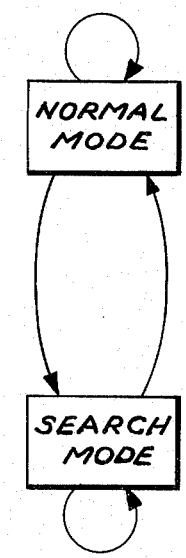

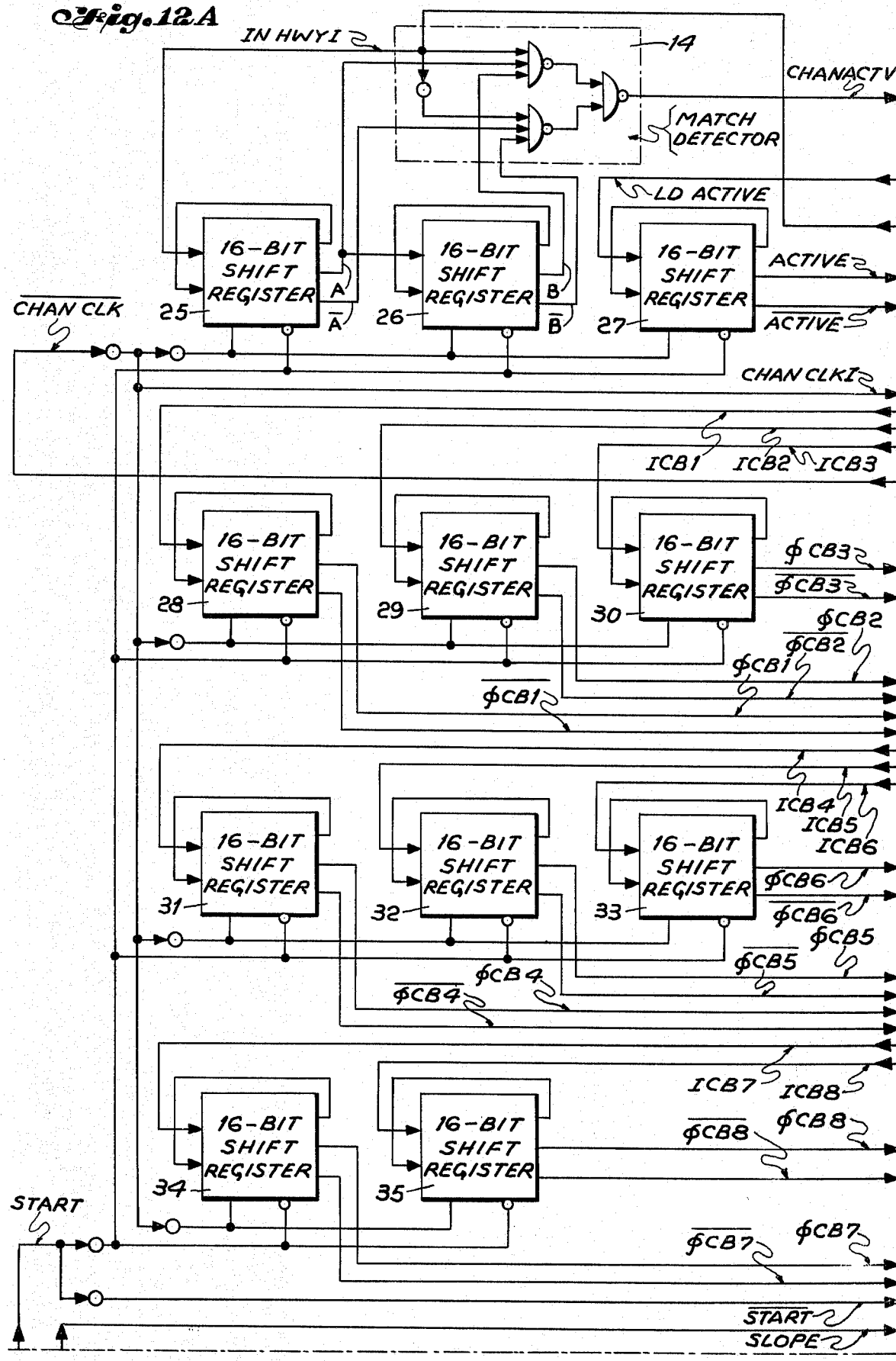

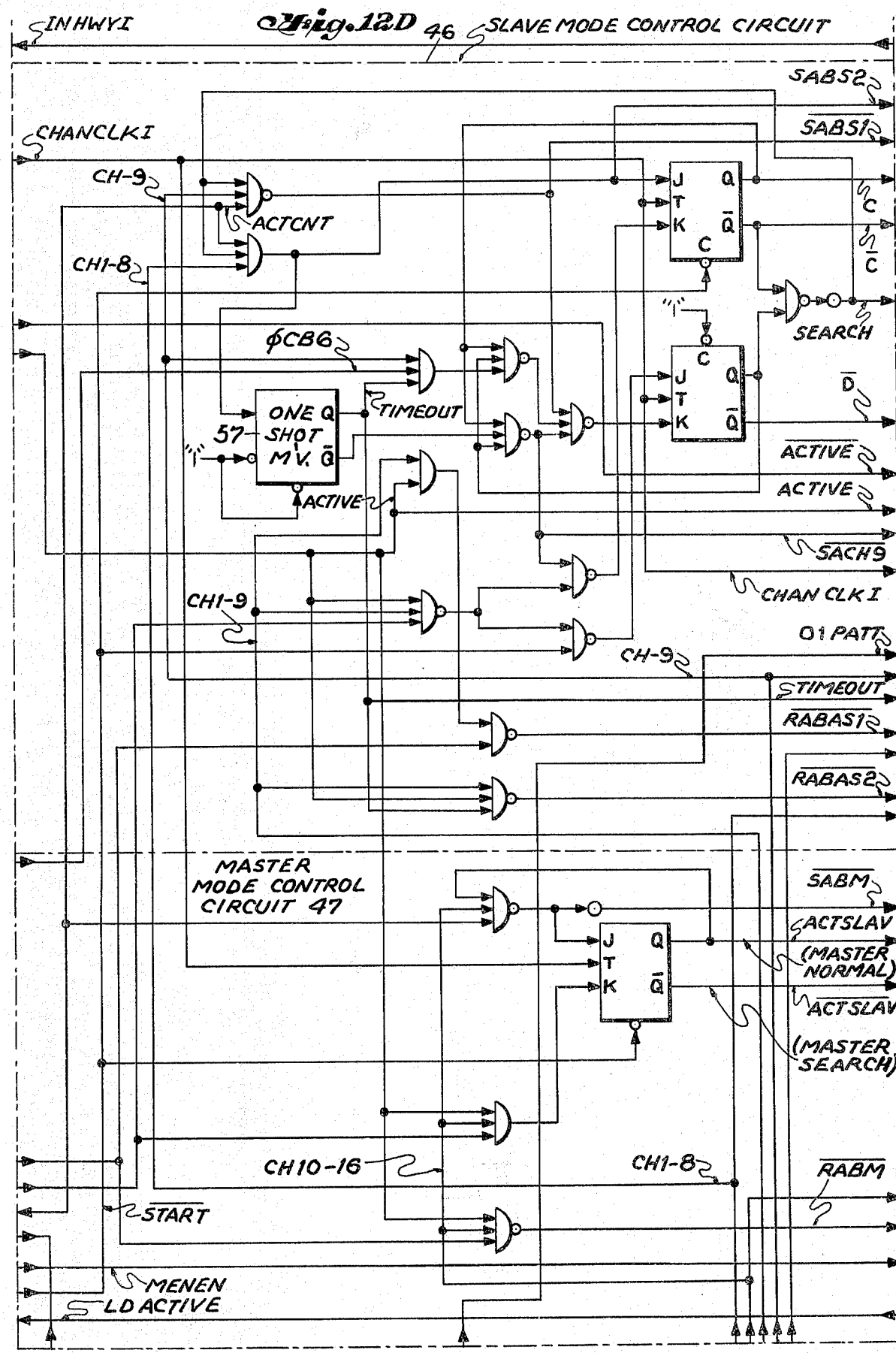

DIGITAL COMPOUND CONFERENCE SYSTEM

BACKGROUND OF THE INVENTION

This invention relates to conference units for use in telephone systems and more particularly to digital conference units employed in telephone systems.

U.S. Pat. No. 3,883,697, whose disclosure is incorporated herein by reference, and the copending application of A. F. Presto, J. G. Dunn and T. C. Chen, Ser. No. 489,574, filed Jul. 18, 1974, now U.S. Pat. No. 3,937,898, whose disclosure is incorporated herein by reference, each disclose a digital conference unit (DCU) that operates as a conference bridge so that at any node in the telephone system the conference bridge is capable of connecting local or remote subscribers into a conference. These prior art DCUs both employ delta modulation.

SUMMARY OF THE INVENTION

An object of the present invention is to provide a continuous variable slope delta modulation (CVSD) DCU that can operate as part of a larger compound conference system connecting local and remote subscriber subsets connected to different ones of a plurality of DCUs into a large single conference.

Another object of the present invention is that one of the DCUs is the controlling master DCU and the other DCUs are each connected by only one trunk to the master DCU.

A feature of the present invention is the provision of a digital compound conference system comprising: a master DCU; a plurality of remote DCUs spaced from the master DCU; a plurality of trunks each connecting a different one of the plurality of remote DCUs to the master DCU; a plurality of conferee subsets coupled to the master DCU; and a plurality of groups of conferee subsets, each of the plurality of groups of conferee subsets being coupled to a different one of the plurality of remote DCUs; the master and the plurality of remote DCUs cooperating under control of the master DCU to connect the plurality of conferee subsets and the plurality of groups of conferee subsets into a single compound conference.

BRIEF DESCRIPTION OF THE DRAWING

Above-mentioned and other features and objects of this invention will become more apparent by reference to the following description taken in conjunction with the accompanying drawing, in which:

FIG. 1 is a block diagram illustrating a compound conference system in accordance with the principles of the present invention;

FIG. 2 illustrates the channel assignments to a DCU of the compound conference system in accordance with the principles of the present invention;

FIG. 3 is a block diagram of an acitivity detector as illustrated in FIG. 1;

FIG. 5 is a logic diagram of a variable counter slope control arrangement capable of being employed with the integrating counter of FIG. 3;

FIG. 9 is a state diagram of a remote DCU in accordance with the principles of the present invention;

FIG. 11 is a state diagram of a master DCU in accordance with the principles of the present invention;

DESCRIPTION OF THE PREFERRED EMBODIMENT

Figure 10:
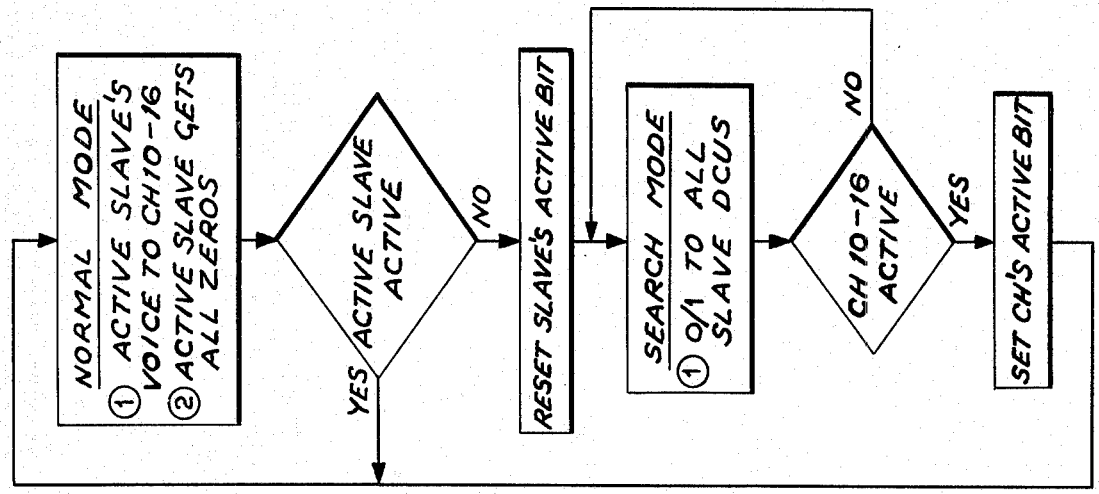
FIG. 10 is a flow diagram of a master DCU in accordance with the principles of the present invention.

Referring to FIG. 1, the continuous variable slope delta modulation digital compound conference system of the present invention includes a master or originating DCU 1, a plurlaity of remote DCUs 2 – 4 and a plurality of trunks 5 – 7, one for communication between a different one of each of the remote DCUs and the master DCU. A plurality of conferees or conferee subsets which may be local or remote subscribers or subscriber subsets as related to DCU 1, identified as conferees or conferee subsets C1 – C4, are coupled to DCU 1. A plurality of groups of conferees or conferee subsets with each of the groups of conferees or conferee subsets being coupled to a different one of the remote DCUs 2 – 4. These groups of conferees or conferee subsets each may include a local or remote subscriber or subscriber subset relative to the DCU they are associated with. One group of conferees or conferee subsets C5 – C7 are coupled to remote DCU 2, a second group of conferees or conferee subsets C8 – C10 are coupled to remote DCU 3 and a third group of conferees or conferee subsets C11 – C12 are coupled to remote DCU 4. Master DCU 1 and remote DCUs 2 – 4 cooperate under control of master DCU 1 to connect the plurality of conferees or conferee subsets C1 – C4 and the plurality of groups of conferees or conferee subsets C5 – C12 into a single compound conference.

As pointed out, only one truck per remote DCU is required and, therefore, no excessive trunks will be employed. To perform as both a master or originating DCU or as a remote DCU, a DCU is composed of two functionally independent portions: a slave portion 8 and a master portion 9. A DCU can be either in slave mode or in master mode. When in slave mode, the slave portion is operational as in the case of slave portions 8a, 8b and 8c and the master portion is inhibited, such as master portion 9a, 9b and 9c. When in master mode, both portions are operational, such as local slave portion 8 and controlling master portion 9.

The slave portion, such as slave portions 8a, 8b and 8c can bridge up to eight conferees connected to it either by the node switch or by a multiplexer. The master portion, such as master portion 9, can bridge up to six remote DCUs connected to it by the same means. Each compound conference system includes one controlling master portion 9 which has its own slave portion which can bridge up to eight conferees while the master portion 9 can bridge up to six remote slave portions each of which can bridge eight conferees resulting in 48 remote conferees. The total number, therefore, of conferees in a compound conference system can be 56.

Note that placing the DCU into any mode will normally be done by the different node processors (not shown) when the compound conference system is being set up. The DCU 1 at the node originating the conference will be placed in master mode and the DCUs 2 – 4 at the remote nodes will be placed in slave mode by their own node processors. The connections of the local conferees channels into each DCU as well as the master-to-slave trunks (one such trunk is required between each master DCU and slave or remote DCU) will also be done by the node processor.

It should be noted that the compound conference system shown in FIG. 1 is only an example of the operation of the compound conference system in accordance with the principles of the present invention.

The basic idea behind the operation of the compound conference system is the two levels of activity detection which decide the next speaker to broadcast to all conferees after the current speaker stops talking. One level of detection is done at the slave portion of the remote DCU and the other level of detection is done at the master DCU. The master DCU makes the final decision as to the next speaker and makes the appropriate voice connections.

Using the compound conference system of FIG. 1, the operation of the compound conference system will now be described in greater detail. Assume a present speaker stops talking, the activity detector 10 in the speaker slave portion of the DCU detects the inactivity and starts sending an 01 binary pattern (which is equal to silence in continuous variable slope delta modulation) to the other local conferees and to the master DCU 1 on their communication trunk. The master activity detector 11 detects this inactivity and sends this inactivity to all other DCUs. These other DCUs also detect this inactivity and send it to their respective conferees. At this point the entire system is silent, each conferee is receiving the 01 pattern and all remote and master DCUs are in "search" mode looking for the next speaker. Assume now that conferee C12 and conferee C6 start talking. If conferee C12 is a bit louder than conferee C6, the activity detector 10c in his remote conference unit 4 detects his activity sooner than does the activity detector 10a of remote DCU 2. Both activities are sent to the master DCU 1 and it detects the activity of conferee C12 first. The activity of conferee C12 which is the actual voice of conferee C12 is now sent by DCU 1 to all remote DCUs 2 – 4 participating in the conference. Remote DCU 4 to which conferee C12 is connected will receive a stream of all 0's from DCU 1 indicating that DCU 4 is currently the speaker on the compound conference system. The slave portion 8c of DCU 4 will detect the string of 0's with an all 0 detector. It will then place itself in a "local speaker" mode and connect the activity coming from conferee C12 to the other local conferees directly (not through DCU 1 which continues to send 0's for the entire time conferee C12 is the speaker on the compound conference system).

When conferee C12 ceases talking, both DCU 4 and master DCU 1 detect the inactivity and the conference becomes silent awaiting the next speaker. Note that this method employs a single final decision maker which decides the next speaker and informs the remote DCU of the next speaker of this decision. Also note that the communication between each remote DCU and the master DCU is done on a single voice communication trunk and no special treatment of this trunk by the node switch is necessary. The slave portion 8 of master DCU 1 receives the same treatment as all slave portions 8a, 8b and 8c and their conferees have the same probability of speaking to all compound conference system conferees as other conferees.

Each DCU communicates on sixteen time division multiplexed channels. FIG. 2 shows the utilization of the sixteen channels in a DCU. Channels 1 – 8 are assigned for communication between a remote DCU and its associated conferees. Channel 9 is used by a remote DCU to communicate with the master DCU. Channels 10 – 16 are used by the master DCU to communicate with slave portions of the remote DCUs. Channel 10 is used by the master DCU to communicate with its own slave portion and channels 11 – 16 are used to communicate with remote DCUs. When a node processor is setting up a compound conference system, it would have to connect the various channels to the DCU following this scheme whether this is done using the node switch or a separate multiplexer/demultiplexer.

Each of the sixteen incoming communication channels as shown in FIG. 2 has its own acitivity detector. In actuality being that the channels are time division multiplexed there is a need for only a single activity detector which can be time shared by all channels as illustrated in FIG. 3. Every channel has an 11-bit word stored in a cyclic memory 12 which consists of eleven 16-bit shift registers. Cyclic memory 12 contains information needed by the activity detectors. The memory 12 cycles with the basic system channel clock which is the clock at which the time division channels enter and leave the DCU (32 Kb/s $\times$ 16 for a 32 Kb/s system and 16 Kb/s $\times$ 16 for a 16 Kb/s system, where Kb/s means kilobits per second). Therefore, when a new bit of information of channel n enters the DCU, it's cyclic memory word enters the activity detector. The activity detector examines the new bit and the memory word, makes a decision about the activity, and updates the memory word. It then shifts the new word into storage with the channel clock for the same time that the new bit for channel ($n + 1$) enters the DCU and its memory word enters the activity detector.

The eleven bits in the memory word include the last two incoming bits of each channel, and 8-bit integrating counter 13 which presents the current activity status of each channel, and an "ACTIVE" bit update circuit 15 which when set indicates that the channel is currently active and seeks or has control over the compound conference system.

The above cited copending application describes the basic concept used in detecting continuous variable slope delta modulation activity, i.e., the detection of several "matches" (three consecutive 1's or three consecutive 0's in an 8 millisecond (msec.) period). These "matches" would be detected in detector 14. The only deviation of the DCU activity detector in the present application is the utilization of an integrating up/down counter 13 for counting matches rather than a periodical up counter which is reset and examined every 8 msec. The advantage of using the integrating counter 13 is that it provides an instantaneous indication of the activity of the channel without waiting for the artificial 8 msec. period to end which may cause unnecessary clipping. The integrating counter's slope (up/down counting ratio) can be made variable to accommodate different ambient noise levels. Also the threshold at which activity is determined can be made variable to accommodate different types of speakers. The following is a calculation of the counter slopes and thresholds for the DCU based on the data presented in the graph of FIG. 4.

let $P_U$ be the probability of getting matches (up counts) and $P_D$ be the probability of getting mismatches (down count)

$P_U$ = MATCHES/(MATCHES + MISMATCHES) = UP COUNTS/(UP COUNTS + DOWN COUNTS)

$P_D$ = MISMATCHES/(MATCHES + MISMATCHES) = DOWN COUNTS/(UP COUNTS + DOWN COUNTS)

Let S:1 be the slope of the up/down counter.

S = DOWN COUNTS/UP COUNTS

S which is one of the variable parameters of the DCU has to be selected such that for a certain maximum level of ambient noise counter 13 will not count up or down but will stay around a given level. When, however, the activity level is raised by a speaker talking, counter 13 will count up towards a threshold that will determine activity.

Figure 4:
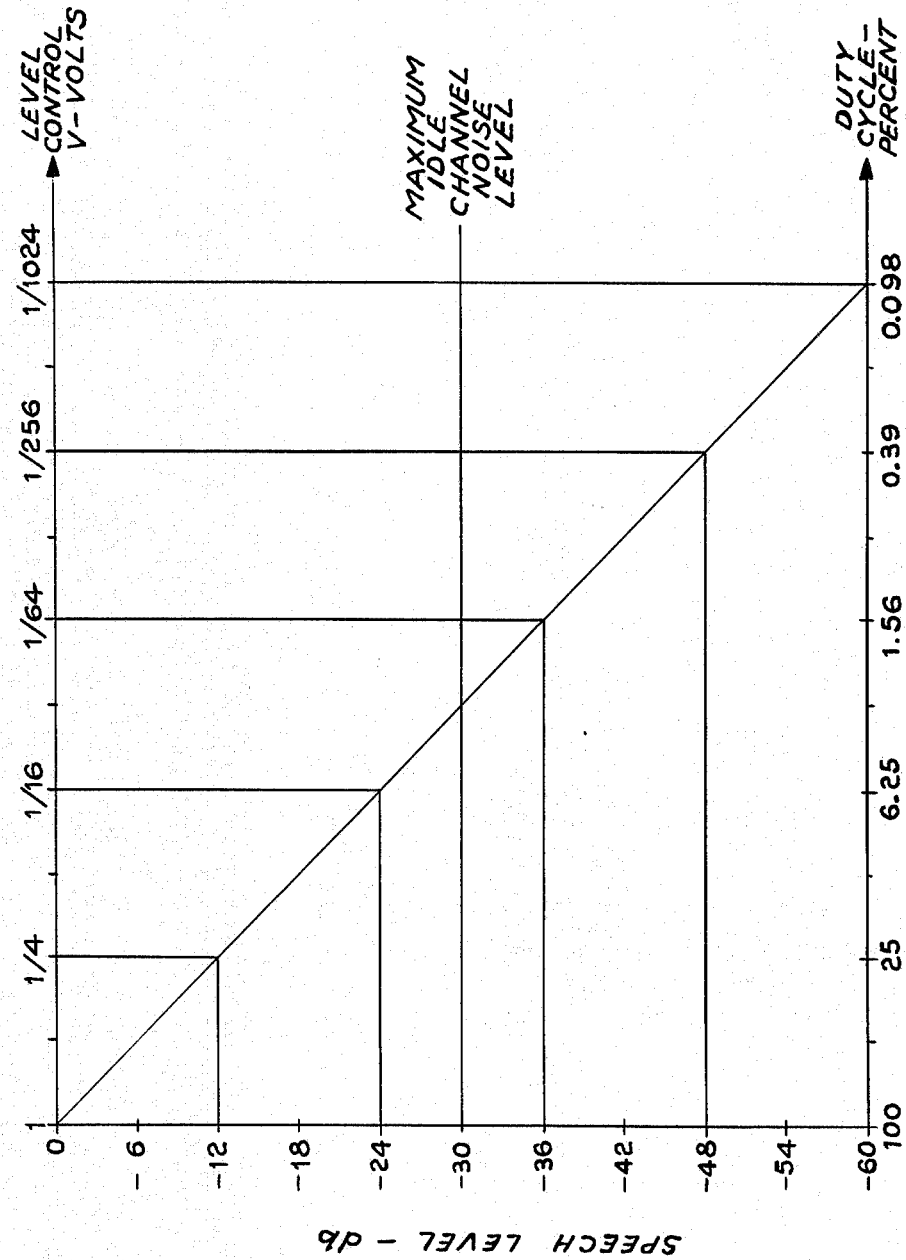
FIG. 4 is a graph illustrating signal level as a function of control voltage.

TABLE I below utilizes FIG. 4 to calculate $P_U$ and S for given levels of activity within the acceptable idle channel noise range.

TABLE I

| SPEECH LEVEL | LEVEL CONTROL | MATCHES IN 8 msec. | $P_U$ | S |
|---|---|---|---|---|
| −24 dB | 1/16 | 16 | 16/256 | 15 (≈16) |
| −30 dB | 1/32 | 8 | 8/256 | 31 (≈32) |
| −36 dB | 1/64 | 4 | 4/256 | 63 (≈64) |
| −42 dB | 1/128 | 2 | 2/256 | 127 (≈128) |

Accomplishing the slope in this type of an integrating counter can be done in one of two ways. The first is counting up by S every time a match occurs and counting down by 1 every time a mismatch occurs. The second is counting up by 1 every match and counting down by 1 every Sth mismatch. The second method is preferable in this case because it requires a smaller counter than the first method. A clock has to be established that gives a pulse every S channel times. This is accomplished as illustrated in FIG. 5 by employing two divide by 16 counters 16 and 17 and AND gates 18–21 connected as illustrated. The clock selected by the slope selector 22 is coupled to AND gate 23 which together with an "inverted match" as provided by NOT gate 24 coupled to match detector 14 provides an indication to the counter to count down. The "match" from detector 14 causes the counter to count up.

Figure 6:
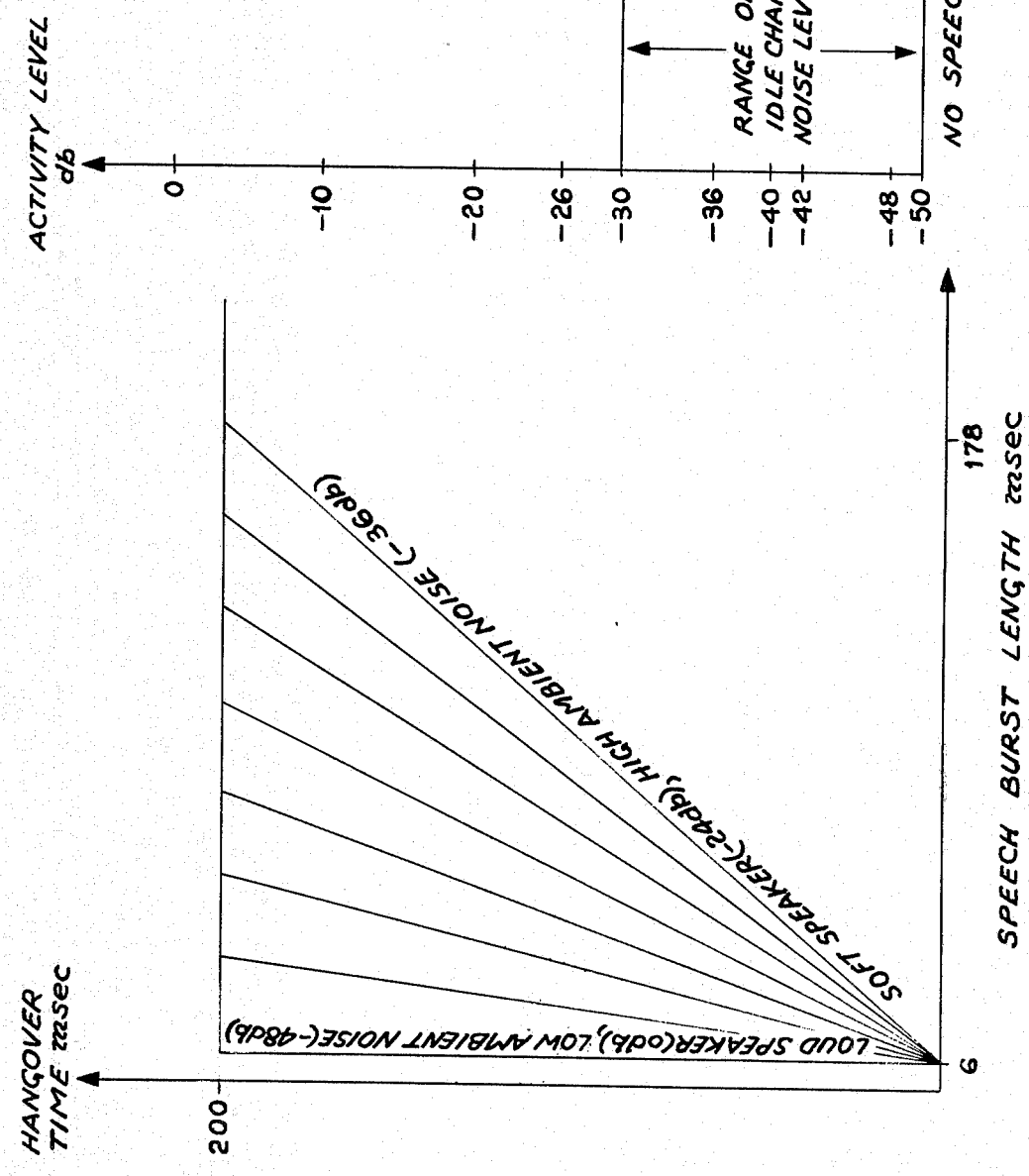
FIG. 6 is a graph illustrating the hangover characteristics of the activity detector of FIG. 3.

Once the integrating counter 13 slope is established, it is necessary to establish counter thresholds. Assume the required attack time is 6 msec. and the decay time is 200 msec. as shown in FIG. 6. These times are the sums of both remote and master DCU's attack and decay times. In the case of the master DCU the situation is simpler because the input is either activity or a complete silence (01 binary pattern). In the case of the remote DCU the input is either high activity as in the case of an active speaker or low activity due to noise.

Figure 7:
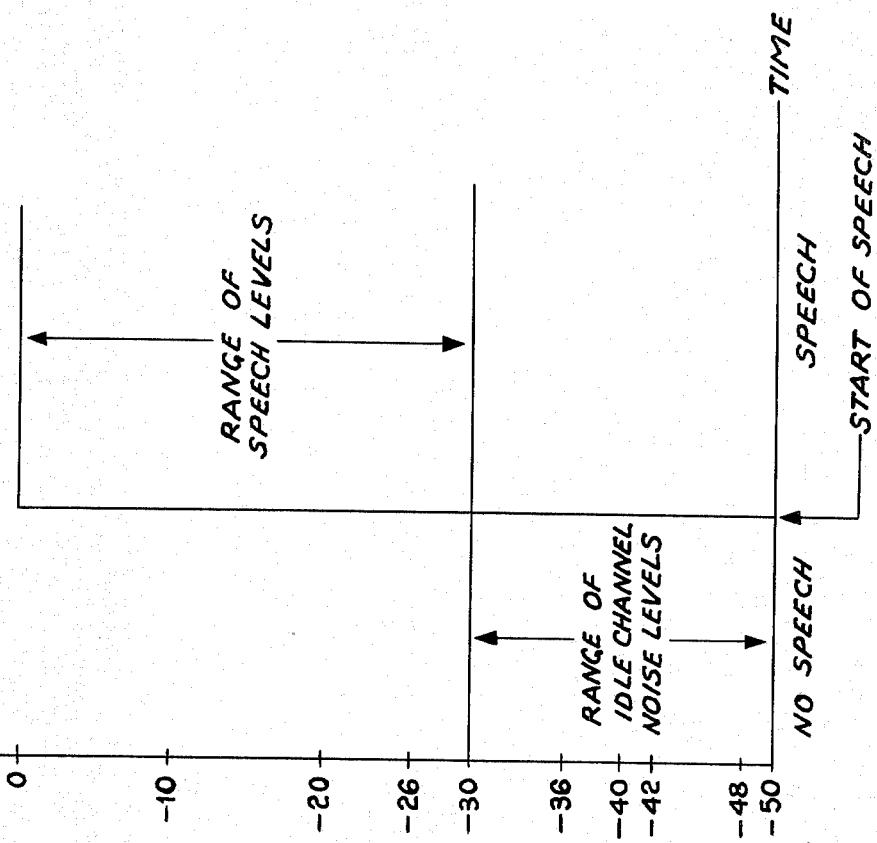
FIG. 7 is a graph illustrating channel activity characteristics.

The counter thresholds are functions of the activity range of speakers and, therefore, will be given in the form of tables that cover the activity range. The expected noise range and activity range are illustrated in FIG. 7, which illustrates the activity characteristics of a channel. FIG. 7 indicates the maximum idle channel noise level to be −30 db (decibels) which translates to 8 matches in 8 msec. (256 samples) according to FIG. 4. The variable slope is now set to 32:1 as illustrated in FIG. 5 and the threshold calculations may now proceed. It can be stated that master attack time and remote attack time are equal because both start at the count of zero and the activity detected by the two counters is the same. As will be made clearer later, there are actually three activity detections involved. One by the orginating remote DCU, one by the master DCU and one by all other slave DCUs. Therefore, to satisfy a total attack time of 6 msec. each attack time should be 2 msec. TABLE II below gives the thresholds required by the various activity levels in the speech range to give an attack time of 2 msec. The equation used for calculating the active threshold is the following:

$$\text{ACTIVE THRESHOLD} = \frac{2 \text{ msec.}}{8 \text{ msec.}} [\text{MATCHES IN 8 msec.} - (\text{MISMATCHES in 8 msec.})/32]$$

Note that the expression in parenthesis gives the position of counter 13 after 8 msec. if starting at count zero.

TABLE II

| LEVEL | MATCHES IN 8 msec. | ACTIVE THRESHOLD |
|---|---|---|
| −24 db | 16 | 2 |
| −18 db | 32 | 6 |
| −12 db | 64 | 15 |
| − 6 db | 128 | 31 |
| 0 db | 256 | 64 |

After a speaker is speaking for a while, his activity counter is at its maximum level. This level is also variable because it serves as a starting count for the decay when activity ceases and should be a function of the speaker activity levels. As activity stops, both remote activity detector and master activity detector start counting down and both will reach the minimum count at approximately the same time. It is then that the remote and master DCUs start searching for a new speaker. The minimum count is fixed at zero, therefore, one has to calculate the maximum threshold that will give a decay time of 200 msec. for the different idle channel noise levels that may be present (which are less than the −30 db maximum). The equation used for this calculation is:

$$\text{MAXIMUM THRESHOLD} = \frac{-200 \text{ msec.}}{8 \text{ msec.}} [\text{MATCHES IN 8 msec.} - (\text{MISMATCHES in 8 msec.})/32]$$

The negative sign indicates the counting is done in the down direction. The results of this calculation are given below in TABLE III.

TABLE III

| BACKGROUND NOISE LEVEL | MATCHES IN 8 msec. | MAXIMUM THRESHOLD |
|---|---|---|
| −36 db | 4 | 100 |
| −42 db | 2 | 150 |
| −40 db | 1 | 175 |
| −54 db | ½ | 188 |

The only threshold remaining to be calculated is the one reached by the counter when the remote DCU receives the all 0's response from the master DCU. As a reminder this response indicates to the remote DCU that the conferee he selected as the "local speaker" is now the speaker on the entire compound conference system. This response arrives on channel 9 which is the communication trunk between the remote DCU and the master DCU in the slave portion and is detected by an all 0 detector. To provide the same delay of 6 msec. as all other conferees experience, the actual time for detecting the all 0's response should be 2 msec. In this time 64 bits enter the remote DCU on channel 9. If one assumes transmission error to be small, one can expect at least 61 matches within the 2 msec. period. The 0 detection threshold should therefore be set to 61. Note that the master DCU sends all 0's to the selected remote DCU only after it detected activity on the channel which requires 2 msec. The remote DCU starts examining channel 9 as soon as he starts sending activity to the master DCU. The total detection time should therefore be 4 msec.

Figure 8:
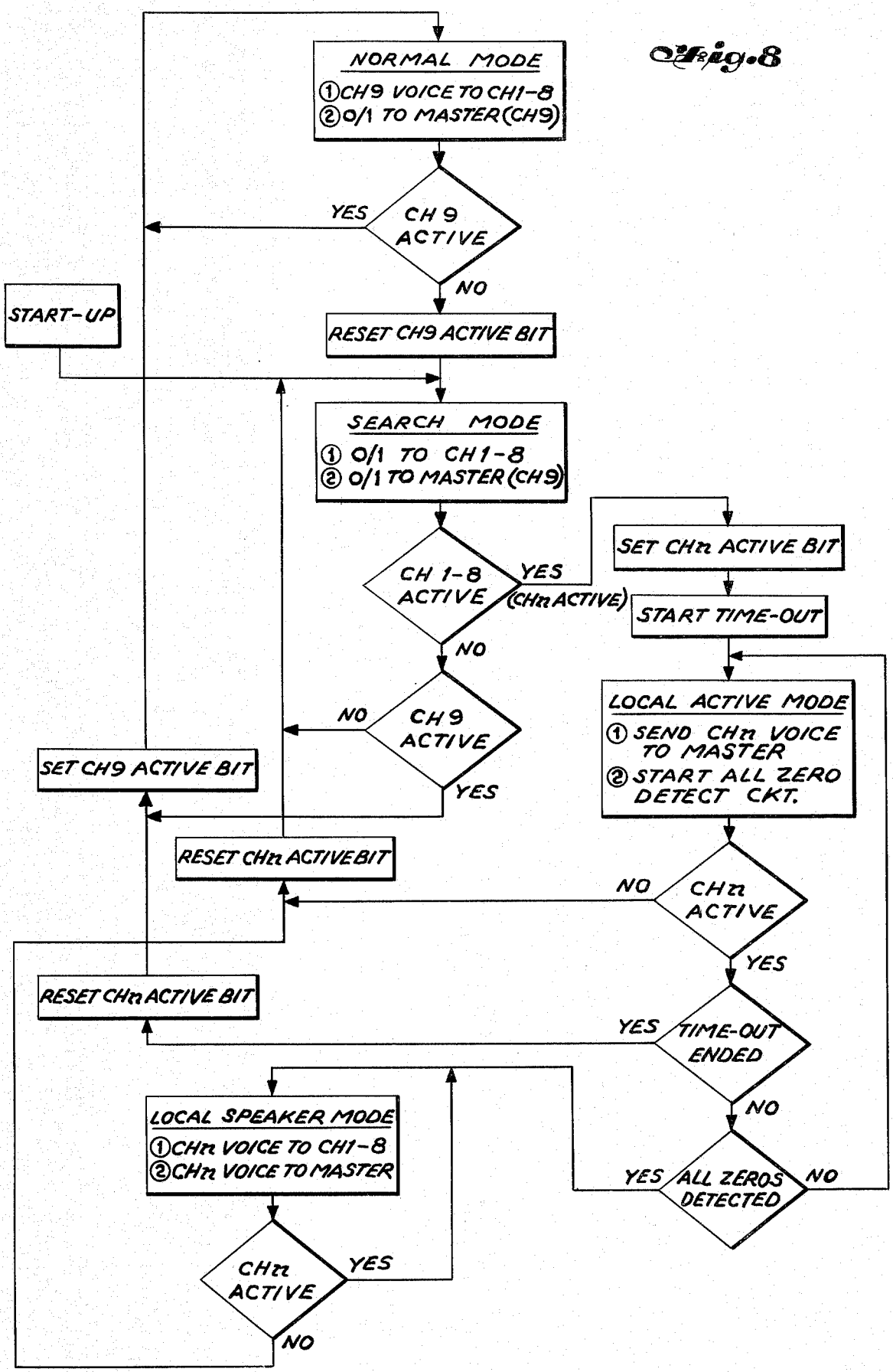
FIG. 8 is a flow diagram of a remote DCU in accordance with the principles of the present invention.

FIG. 8 illustrates the flow chart of the operation of the remote DCU and FIG. 9 illustrates the state diagram of the remote DCU. The remote DCU can be in one of the following four modes (states).
1. NORMAL MODE
2. SEARCH MODE
3. LOCAL ACTIVE MODE
4. LOCAL SPEAKER MODE Upon node power-up, the remote DCU is placed into SEARCH MODE where it stays examining channels 1 – 9 for activity. While in this mode the remote DCU sends the 01 pattern (silence) to local or remote conferees (channels 1 – 8) and the master DCU (channel 9). When activity is detected on channel 9 it indicates that another remote DCU has detected activity and the master DCU is sending this activity to the other slave DCU'S. The remote DCU sets the ACTIVE bit of channel 9, goes into NORMAL MODE, and sends data received on channel 9 to its local or remote conferees on channels 1 – 8. When this activity ceases, the ACTIVE bit is reset and the remote DCU returns to SEARCH MODE. When activity is detected on a local or remote conferee (channels 1 – 8) the ACTIVE bit of that channel is set and the remote DCU enters the LOCAL ACTIVE MODE. In this mode the activity of the active conferee is sent to the master DCU on channel 9. Channels 1 – 8 still receive the 01 pattern indicating no activity. Also when the remote DCU enters this mode the all 0's detection procedure starts which involves looking at channel 9 for the all 0's response from the master DCU and starting a time-out circuit which provides a 4.5 msec. period which is larger than the 4 msec. required to detect the all 0's response. If the 4 msec. elapse with no detection of all 0's on channel 9, the remote DCU assumes that another slave DCU acquired control, sets channel 9 ACTIVE bit and goes into the NORMAL MODE. If at any time the active channel becomes inactive, the remote DCU returns to the SEARCH MODE. If after 4 msec. (during the 4.5 msec. time-out period) the all 0's response is detected, the remote DCU understands that his active conferee is the speaker on the entire compound conference system and goes into the LOCAL SPEAKER MODE. In this mode the incoming data on the active channel is sent to all local or remote conferees of this remote DCU except for the active channel itself. This is done because the active channel receives its own side-tone already. The remote DCU remains in this state until activity ceases on that channel, at which point the ACTIVE bit of the channel is reset and the remote DCU returns to the SEARCH MODE.

FIG. 10 illustrates the flow chart of the operation of the master DCU and FIG. 11 illustrates the state diagram of the master DCU. The master DCU, when not inhibited, can be in one of two modes:
1. NORMAL MODE
2. SEARCH MODE Referring to FIG. 10, upon node power-up the master DCU is placed in SEARCH MODE where it remains examining channels 10 – 16 for activity. Remember that channels 10 – 16 are the communication channels between the master DCU and the remote DCUs. These channels are silent (01 pattern) as long as their respective remote DCU is not detecting activity. When a remote DCU detects activity, it sends it to the master DCU and the latter goes into NORMAL MODE, sets the ACTIVE bit of that channel and sends this activity to all other remote DCUs. The active remote DCU gets all 0's which indicates that it is the speaker on the compound conference system. When activity ceases in that channel, the ACTIVE bit is reset and the master DCU goes into SEARCH MODE sending the 01 pattern to all remote DCUs.

Figure 12B:
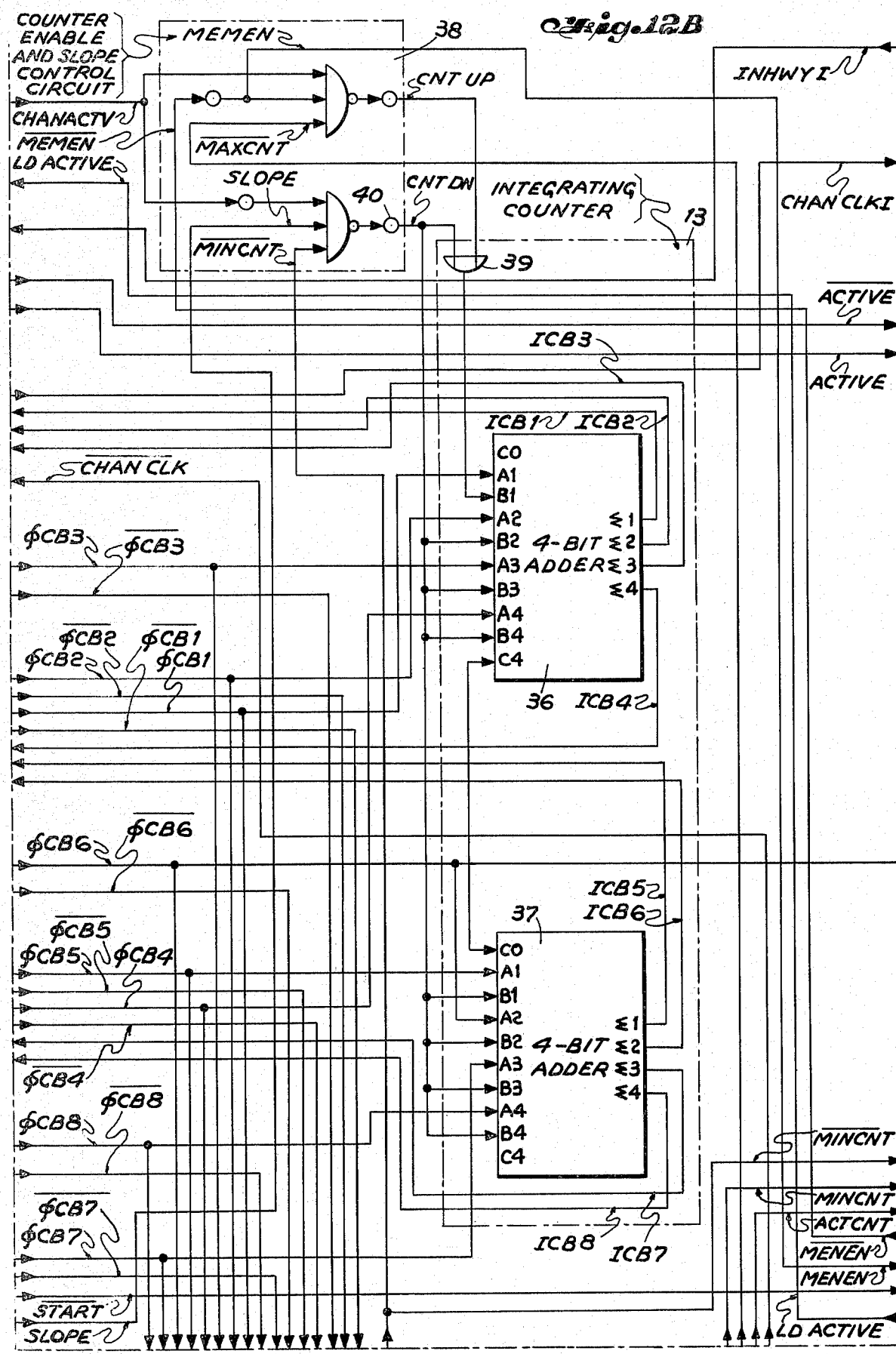
FIGS. 12A – 12G, when organized as illustrated in FIG. 12H, is a logic diagram of a DCU employed in the compound conference system in accordance with the principles of the present invention.
Figure 12C:
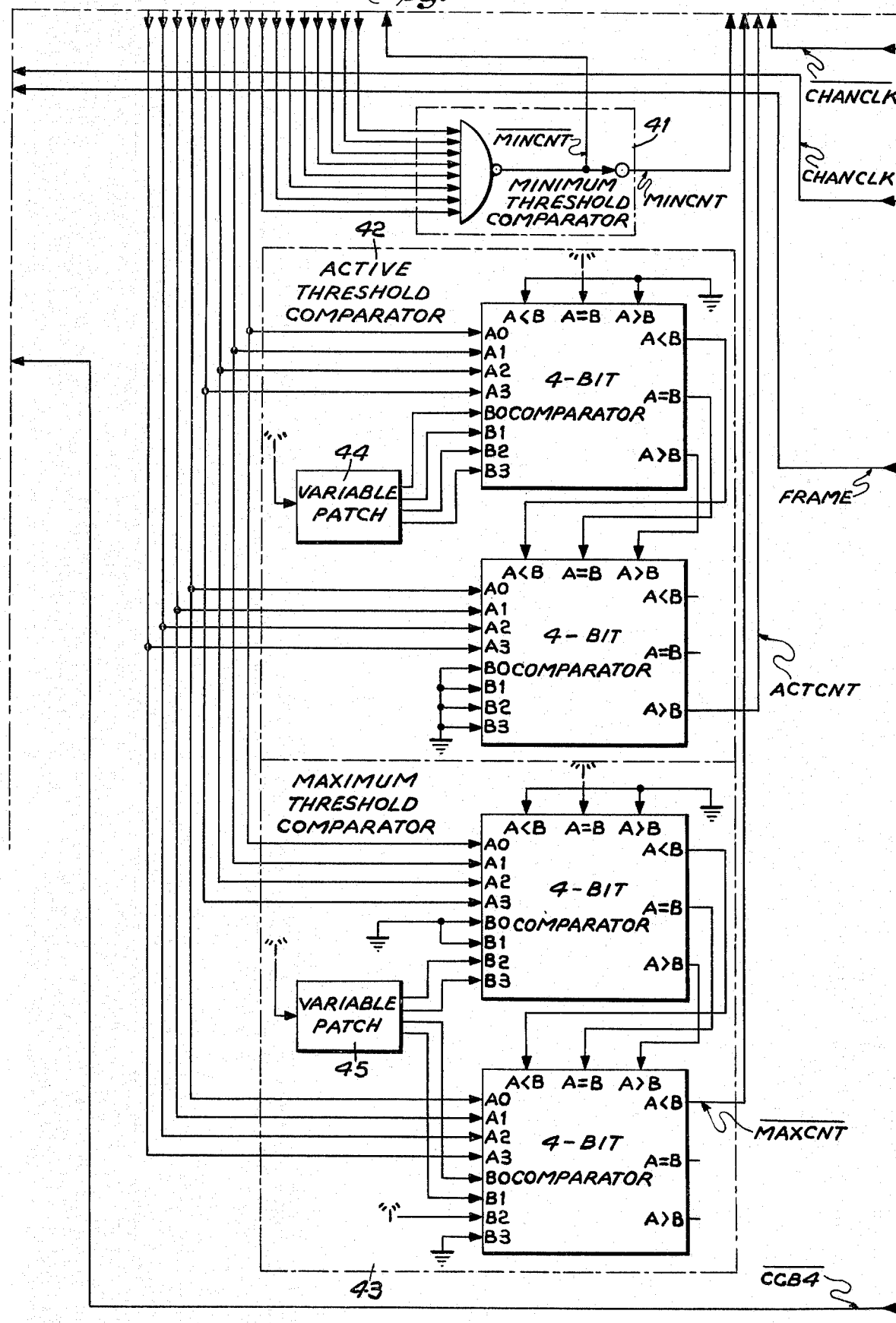
Figure 12E:
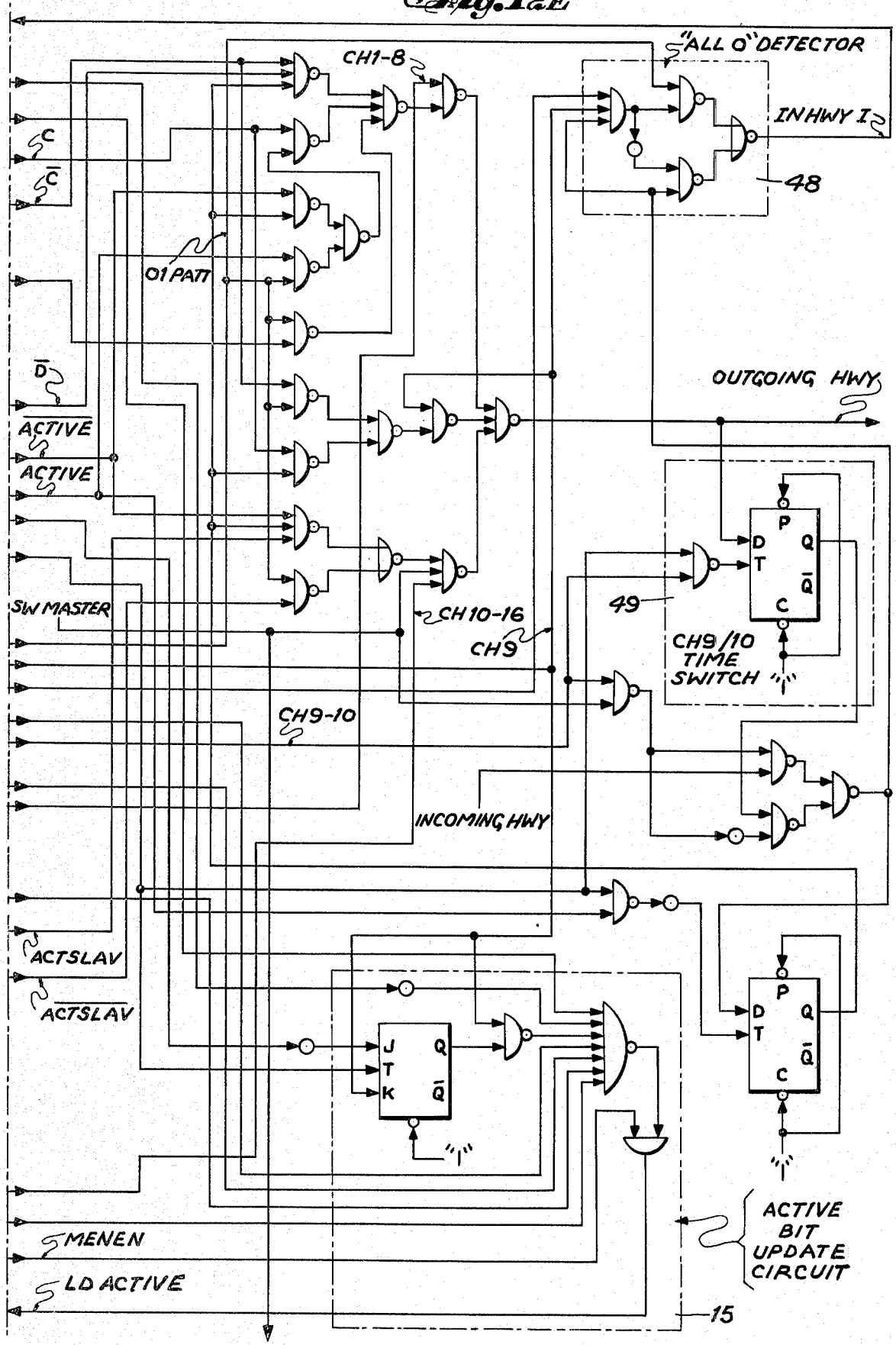
Figure 12F:
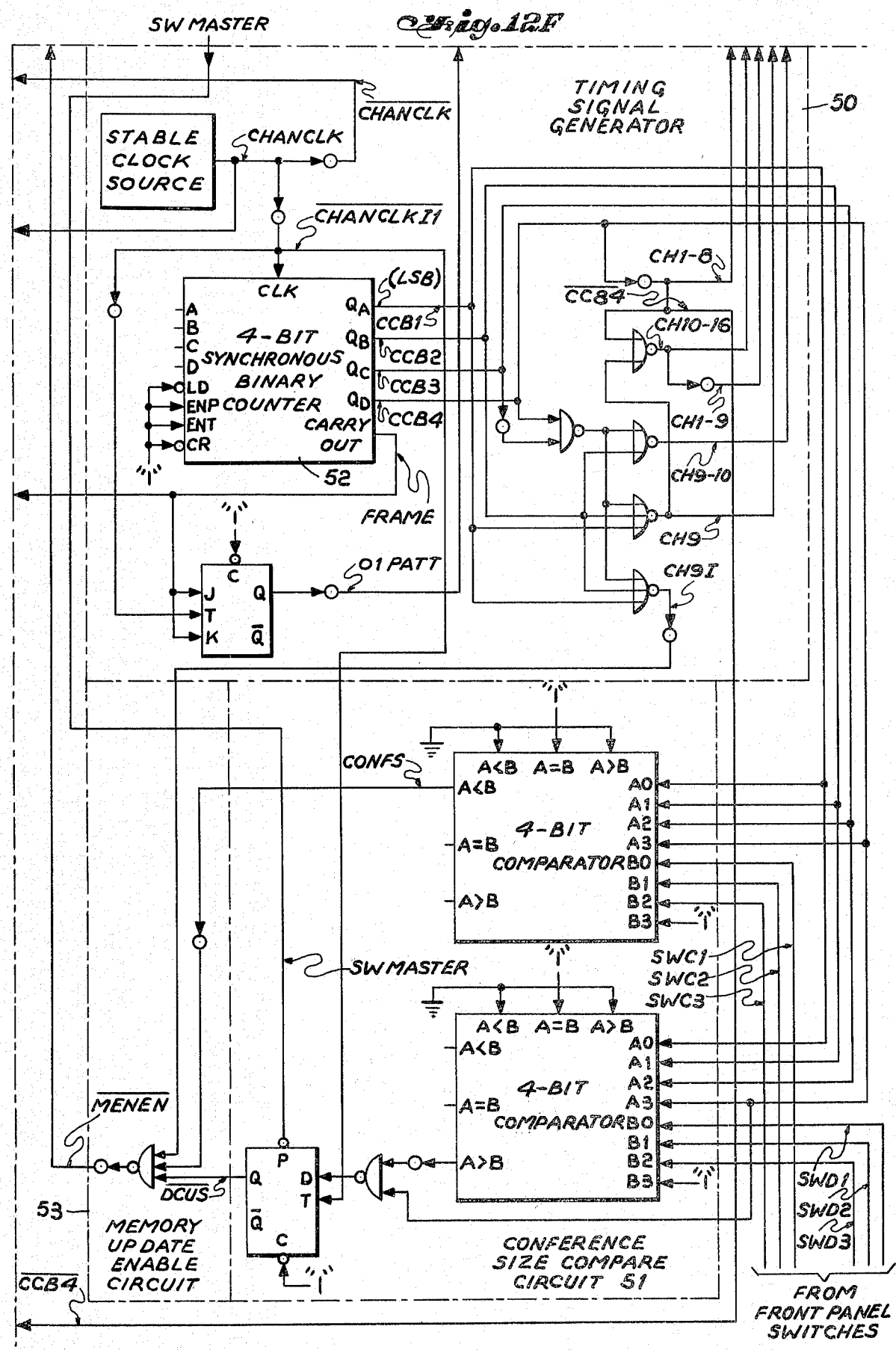
Figure 12G:
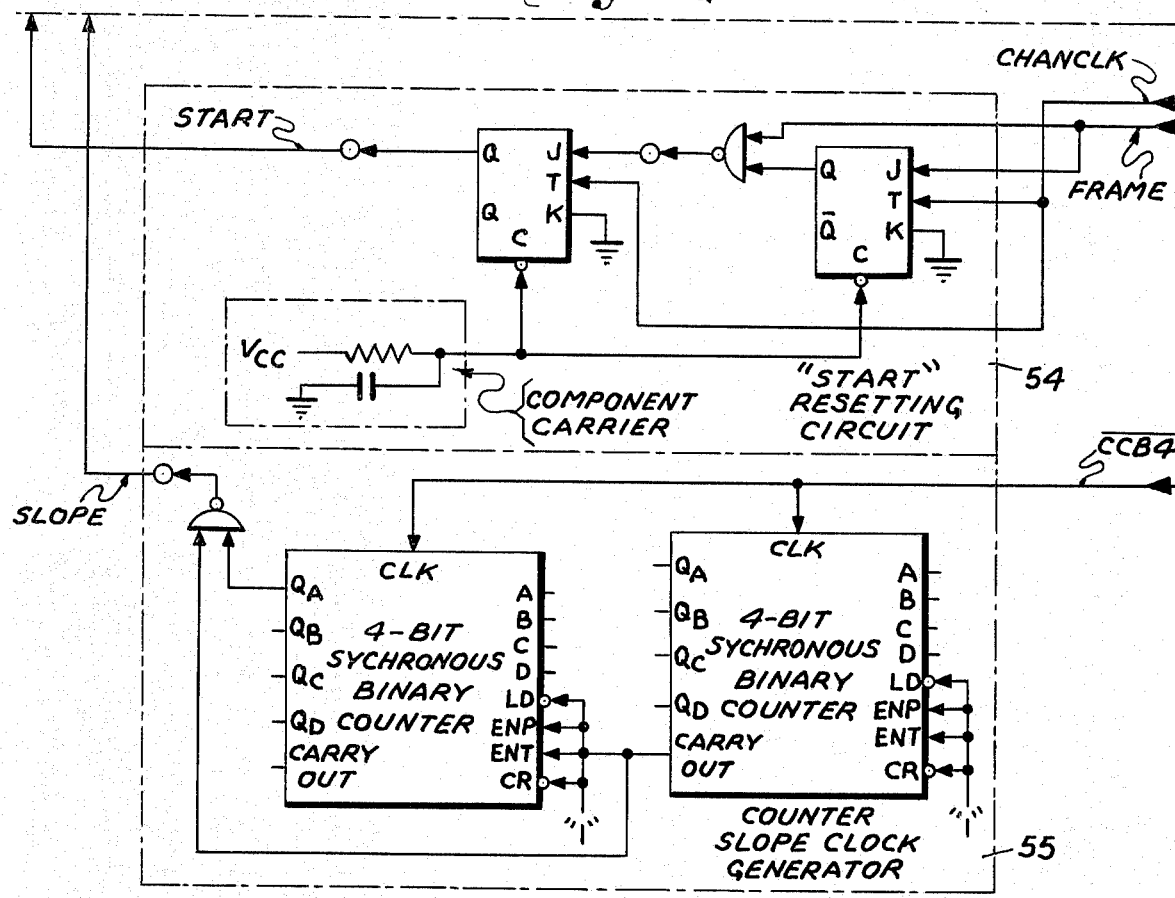
Figure 12H:
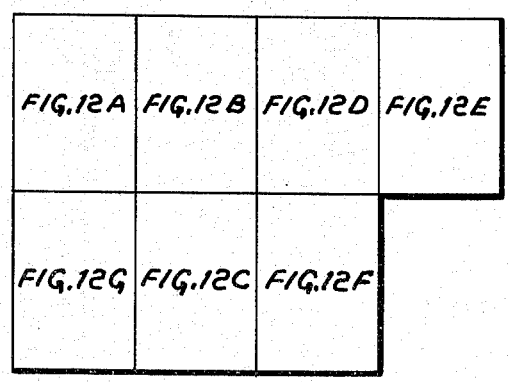

Referring to FIGS. 12A – 12G organized as illustrated in FIG. 12H, there is illustrated therein one manner of implementing a DCU employing integrated circuit components that can be obtained as an "off-the-shelf" item of many integrated circuit manufacturers, such as Texas Instruments, Inc., Motorola and Fairchild.

Figure 13:
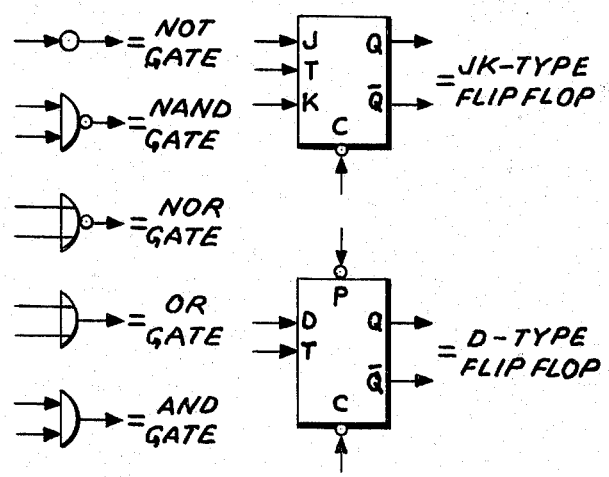
FIG. 13 is a key to the logic symbols employed in FIGS. 12A – 12G.

FIG. 13 is a key to the logic symbols employed in the FIGS. 12A – 12G.

To assist in understanding the operation of the logic diagram, there is presented hereinbelow a list of mnemonics employed in these diagrams to enable tracing the operation of the logic diagram.

| | |
|---|---|
| INHWY I | - INCOMING HIGHWAY INTERNAL |
| CHANACTV | - CHANNEL ACTIVE |
| CHANCLK I | - CHANNEL CLOCK, INTERNAL |
| CHANCLK | - CHANNEL CLOCK (512 Kb/s FOR 16 CHANNEL DCU at 32 Kb/s) |
| START | - START-UP PULSE CREATED TO CLEAR IMPORTANT REGISTERS UPON POWER-ON |
| LDACTIVE | - LOAD ACTIVE |
| ACTIVE | - ACTIVE BIT (SET WHEN A TALKER IS TALKING) |
| A | - STORE FOR PREVIOUS DATA BIT |
| B | - STORE FOR ONE BEFORE PREVIOUS DATA BIT |
| ICB 1 – 8 | - INCOMING COUNTER BIT 1 – 8 |
| φCB 1 – 8 | - OUTGOING COUNTER BIT 1 – 8 |
| MEMEN | - MEMORY ENABLE |
| MAXCNT | - MAXIMUM COUNT |
| MINCNT | - MINIMUM COUNT |
| SLOPE | - COUNTER SLOPE (CREATES UP/DOWN |

-continued

| | COUNTING RATIO) |
|---|---|
| CNT UP | - COUNT UP |
| CNT DN | - COUNT DOWN |
| ACT CNT | - ACTIVE THRESHOLD COUNT |
| SEARCH | - SEARCH FOR NEXT ACTIVE |
| CH 9 | - CHANNEL 9 TIME |
| CH 1 – 8 | - CHANNEL 1 TO CHANNEL 8 TIME (INC.) |
| SABS1 | - SET ACTIVE BIT OF SUBSCRIBER (1st PATH) |
| SABS2 | - SET ACTIVE BIT OF SUBSCRIBER (2nd PATH) |
| C | - DCU STATUS BIT C |
| D | - DCU STATUS BIT D |
| RABAS1 | - RESET ACTIVE BIT OF ACTIVE SUBSCRIBER (1st PATH) |
| RABAS2 | - RESET ACTIVE BIT OF ACTIVE SUBSCRIBER (2nd PATH) |
| TIME OUT | - TIME OUT (WAITING FOR RESPONSE FROM MASTER) |
| SACH9 | - SET ACTIVE BIT OF CHANNEL 9 |
| CH 10 – 16 | - CHANNEL 10 TO CHANNEL 16 TIME (INC.) |
| SABM | - SET ACTIVE BIT OF MASTER |
| RABM | - RESET ACTIVE BIT OF MASTER |
| ACTSLAV | - ACTIVE SLAVE |
| 01 PATT | - BINARY 1 PATTERN (EQUIVALENT TO SILENCE IN CVSD) |
| SW MASTER | - SWITCH MASTER (FRONT PANEL SWITCH SELECTED THIS DCU AS COMPOUND CONFERENCE MASTER) |
| INCOMING HWY | - DATA INPUT TO DCU (FROM MUX) |
| OUTGOING HWY | - DATA OUTPUT OF DCU (TO DEMUX) |
| CH 9 – 10 | - CHANNEL 9 AND CHANNEL 10 TIME INC. |
| CCB1 – CCB4 | - CHANNEL COUNTER BITS 1 TO 4 |
| FRAME (CLOCK) | - COINCIDES WITH CHANNEL 16 TIME |
| SWC1 – SWC3 | - INPUTS FROM FRONT PANEL SWITCHES INDICATING NUMBER OF LOCAL CONFEREES CONNECTED TO THIS SLAVE |
| SWD1 – SWD3 | - INPUTS FROM FRONT PANEL SWITCHES INDICATING NUMBER OF REMOTE DCUS CONNECTED TO THIS MASTER (1 TO 6) |
| CONFSB | - CONFERENCE SIZE BIT (="1" FOR LOCAL CONFEREES) |
| DCUSB | - DCU SIZE BIT (="1" FOR LOCAL CONFEREES & REMOTE DCUS) |

The match detector 14 is shown in FIG. 12A together with the eleven 16-bit shift registers 25 – 35 which form the cyclic memory 12 of FIG. 3. Shift registers 25 – 35 in effect are a group of eleven 16-bit shift registers which are shifted simultaneously.

The outputs from shift registers 25 and 26 cooperate with match detector 14 to produce a control signal which determines the direction of count of the integrating counter 13. Shift register 27 provides an output indicating an ACTIVE channel. Shift registers 28 – 34 provide outputs which are coupled to integrating counter 13 in the form of 4-bit adders 36 and 37.

The output from match detector 14 is coupled to the counter enable and slope control circuit 38 to produce a count up or count down signal to control the direction of counting of integrating counter 13.

Integrating counter 13 in the form of adders 36 and 37. Counters 36 and 37 will count up by adding 1 from OR gate 39 and to count down there is added 11111111 from the output of NOT gate 40 and disregard carry. This is equal to subtracting 1 and thus counting down.

The count threshold circuits of integrating counter 13 are shown in FIG. 12C and include a minimum threshold comparator 41, an active threshold comparator 42 and a maximum threshold comparator 43. These comparators 41 – 43 establish the various thresholds discussed hereinabove.

The variable patches 44 and 45 included in comparators 42 and 43 enable the establishment of a variable threshold employed to compare counter level.

The ACTIVE bit up date circuit 15 is shown on FIG. 12E and is under control of the slave mode control circuit 46 and the master mode control circuit 47, which also operate to provide the slave portion and the master portion of a DCU.

An "all 0" detector 48 (FIG. 12E) is employed to detect the all 0 signal received from the master DCU when activity is detected by the master DCU. The remaining logic circuitry in FIG. 12E is directed to that portion of the DCU containing an incoming highway connection which receives data from another DCU and an outgoing highway which sends data to another DCU. This circuitry includes a channel 9/10 time switch 49 to enable changing the direction of communication.

There is provided as shown in FIG. 12F a timing signal generator 50 to control the time of operation of the remainder of the logic circuitry of the DCU. It is not actually necessary in a full scale operating system to provide a separate timing signal generator since most of the timing signals will be provided by switch timing subsystem of a telephone system in which the DCU would be employed.

A conference size compare circuit 51 comparing the output of the 4-bit synchronous binary counter 52 of generator 50 with the setting of the front panel switches enables the producing of a memory enable signal in memory up date enable circuit 53.

A START reset circuit 54 provides a START pulse to clear registers and other circuit upon power-on.

The counter slope clock generator 55 is similar to the circuitry of FIG. 5 to produce the slope timing signal. While this generator 55 is organized to produce only one counting ratio; namely, 32:1, it would be possible to employ the other Q outputs of the 4-bit synchronous binary counter 56 to produce the SLOPE signal when connected as illustrated in FIG. 5.

The one shot multivibrator 57 contained in the slope mode control circuit 36 of FIG. 12D provides the timeout signal mentioned hereinabove in the general discussion of the operation of the DCU.

While I have described above the principles of my invention in connection with specific apparatus it is to be clearly understood that this description is made only by way of example and not as a limitation to the scope of my invention as set forth in the objects thereof and in the accompanying claims.

I claim:

1. A digital compound conference system comprising:
   a master digital conference unit;
   a plurality of remote digital conference units spaced from said master digital conference unit;
   a plurality of trunks each connecting a different one of said plurality of remote digital conference units to said master digital conference unit;
   a plurality of conferee subsets coupled to said master digital conference unit; and
   a plurality of groups of conferee subsets, each of said plurality of groups of conferee subsets being coupled to a different one of said plurality of remote digital conference units;
   said master and said plurality of remote digital conference units cooperating under control of said master digital conference unit to connect said plurality of conferee subsets and said plurality of groups of conferee subsets into a single compound conference.

2. A system according to claim 1, wherein
   data from said plurality of conferee subsets and said plurality of groups of remote conferee subsets is transmitted in the form of continuous variable slope delta modulation.

3. A system according to claim 2, wherein
   each of said master and said plurality of remote digital conference units have functionally a master portion and a slave portion,
   each of said plurality of remote digital conference units having said slave portion operative with said master portion inhibited to control the associated one of said plurality of groups of conferee subsets and
   said master digital conference unit has said master portion operative to control each of said slave portions of said plurality of remote digital conference units and has said slave portion operative to control said plurality of conferee subsets.

4. A system according to claim 3, wherein
   each of said master and said plurality of remote digital conference units transmits in sixteen time division multiplexed channels, with channels one through eight being assigned to said plurality of conferee subsets and said pluraltiy of groups of conferee subsets for communication with an associated one of said slave portions of said master and said plurality of remote digital conference units with channel nine being assigned for use by said slave portions of said master and said plurality of remote digital conference units to communicate with said master portion of said master digital conference unit, with channel ten being assigned to said master portion of said master digital conference unit to communicate with said slave portion of said master digital conference unit, and with channels eleven through sixteen being assigned to said master portion of said master digital conference unit to communicate with said slave portion of each of said plurality of remote digital conference units.

5. A system according to claim 4, wherein
   a binary pattern 01 indicates inactivity, and
   a stream of binary 0's is sent by said master portion of said master digital conference unit to indicate that one of said slave portions of said master and said plurality of remote digital conference unit to which an active conferee subset is connected and detected as active by said master portion of said master digital conference unit, said stream of 0's cause said one of said slave portions to place itself in a "local speaker" mode and to connect said active conferee subset directly to all conferee subsets associated with said one of said slave portions.

6. A system according to claim 2, wherein
   each of said master and said plurality of remote digital conference units include
   an activity detector.

7. A system according to claim 6, wherein
   each of said activity detectors include
   a cyclic memory coupled to a digital data highway,
   a match detector coupled to said cyclic memory and said highway to produce a count control signal when the present, first preceding and second preceding data bits all have the same logic level,
   an integrating counter coupled to the output and input of said cyclic memory and said match detector responsive to said count control signal to control the count direction,
   count thresholds circuits coupled to said cyclic memory and said counter to control the counting of said counter, and
   an "active" bit update circuit coupled to said counter and an output and an input of said cyclic memory.

8. A system according to claim 7, wherein
   said cyclic memory includes
   eleven sixteen bit shift registers shifted simultaneously by a shift clock.

9. A system according to claim 8, wherein
   said match detector includes
   a first NAND gate coupled to said highway, an uninverted output of a first of said eleven shift registers and an uninverted output of a second of said eleven shift registers,
   a first NOT gate coupled to said highway,
   a second NAND gate coupled to said first NOT gate, an inverted output of said first of said eleven shift registers and an inverted output of said second of said eleven shift registers, and
   a third NAND gate coupled to the output of said first and second NAND gates.

10. A system according to claim 9, wherein
    said count thresholds circuit include
    a minimum threshold comparator coupled to certain ones of said eleven shift registers,
    an active threshold comparator coupled to certain ones of said eleven shift registers, and
    a maximum threshold comparator coupled to certain ones of said eleven shift registers.

11. A system according to claim 10, further including
    a counter enable and slope control circuit including
    a fourth NAND gate coupled to the output of said third NAND gate, a memory enable signal and said maximum threshold comparator, a second NOT gate coupled to the output of said third NAND gate, a fifth NAND gate coupled to said second NOT gate, a slope control signal and said minimum threshold comparator, a third NOT gate coupled to the output of said fourth NAND gate, a fourth NOT gate coupled to the output of said fifth NAND gate, and an OR gate coupled to the output of said third and fourth NOT gates.

12. A system according to claim 11, wherein said counter includes a first four bit adder coupled to the output of the fourth through seventh of said eleven shift registers, the output of said OR gate and the output of said fourth NOT gate, and a second four bit adder coupled to the output of the eighth through eleventh of said eleven shift registers, the output of said first adder and the output of said fourth NOT gate.

13. A system according to claim 12, wherein said update circuit includes a first source of a plurality of master/slave control signals, a second source of two timing signals, a JK-flip flop having its J input coupled to said first source responsive to a given one of said plurality of master/slave control signals, its clock input coupled to said second source responsive to one of said two timing signals and its K input coupled to said second source responsive to the other of said two timing signals, a sixth NAND gate coupled to the Q output of said JK-flip flop and said second source responsive to said other of said two timing signals, a seventh NAND gate coupled to the output of said sixth NAND gate and said first source responsive to the others of said plurality of master/slave control signals, and a first AND gate coupled to the output of said seventh NAND gate and a memory enable signal to produce a load active signal for coupling to the input of the third of said eleven shift registers.

14. A system according to claim 13, further including an "all 0" detector including a second AND gate coupled to an incoming highway and said first and second sources responsive to a timeout control signal of said plurality of master/slave control signals, said other of said two timing signals and data on said incoming highway, a fifth NOT gate coupled to the output of said second AND gate, an eighth NAND gate coupled to said incoming highway and the output of said fifth NOT gate, a ninth NAND gate coupled to the output of said second AND gate and a source of binary pattern 01, and a tenth NAND gate coupled to the output of said eighth and ninth NAND gates to provide an output signal for said "all 0" detector.

* * * * *